(12) United States Patent
Worf et al.

(10) Patent No.: US 6,655,076 B1
(45) Date of Patent: Dec. 2, 2003

(54) LONG LINES

(75) Inventors: Günther Worf, Dudenhofen (DE); Michael Saalmann, Mutterstadt (DE); Svein Sunde, Oslo (NO); Tom Thormodsen, Giovik (NO)

(73) Assignees: BASF Aktiengesellschaft, Ludwigshafen (DE); Mustard & Son A.S., Giovik (NO)

( * ) Notice: Subject to any disclaimer, the term of this patent is extended or adjusted under 35 U.S.C. 154(b) by 363 days.

(21) Appl. No.: 09/297,527

(22) PCT Filed: Nov. 14, 1997

(86) PCT No.: PCT/EP97/06374

§ 371 (c)(1),
(2), (4) Date: May 3, 1999

(87) PCT Pub. No.: WO98/23146

PCT Pub. Date: Jun. 4, 1998

(30) Foreign Application Priority Data

Nov. 22, 1996 (DE) .......................................... 196 48 436

(51) Int. Cl.⁷ ..................... A01K 91/00; A01K 91/047; A01K 91/18
(52) U.S. Cl. ..................... 43/44.9; 43/44.91; 43/44.98
(58) Field of Search ............... 43/44.9, 44.91, 43/44.98

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Handord |
| 2,312,966 A | 3/1943 | Hanford |
| 2,512,606 A | 6/1950 | Bolton |
| 3,393,210 A | 7/1968 | Speck |
| 3,435,552 A | 4/1969 | Caldwell |
| 4,428,143 A * | 1/1984 | Keller .................. 43/44.9 |
| 5,317,046 A * | 5/1994 | Fonkalsrud .............. 523/425 |

FOREIGN PATENT DOCUMENTS

| | | | |
|---|---|---|---|
| CH | 641 637 | 3/1984 | |
| DE | 29 01 774 | 7/1980 | |
| EP | 038 094 | 10/1981 | |
| EP | 038 582 | 10/1981 | |
| EP | 039 524 | 11/1981 | |
| EP | 455 810 | 9/1991 | |
| EP | 514 899 | 11/1992 | |
| JP | 4011010 * | 1/1992 | ............. 43/44.98 |

* cited by examiner

*Primary Examiner*—Kurt Rowan
(74) *Attorney, Agent, or Firm*—Keil & Weinkauf

(57) ABSTRACT

Longline comprises at least one polyamide monofil A) with at least one cylindrical hollow body (stopper) B) secured on the polyamide monofil surface, wherein said stopper B) consists essentially of a thermoplastic elastomer having a Shore D hardness (as defined in DIN 53505) of at least 50.

14 Claims, 1 Drawing Sheet

LONG LINES

BACKGROUND OF THE INVENTION

The present invention relates to longlines comprising at least one polyamide monofil A) with at least one cylindrical hollow body (stopper) B) secured on the polyamide monofil surface, wherein said stopper B) consists essentially of a thermoplastic elastomer having a Shore D hardness (as defined in DIN 53 505) of at least 50.

The present invention further relates to processes for manufacturing longlines according to the present invention and to their use for manufacturing nets, angling lines, fishlines and continuous lines for catching fish and to the resulting continuous lines, angling lines and fishlines.

Longlines comprising stoppers and monofils of plastic are known from CH-A 641 637 and EP-A 445 810.

The monofils comprise polyamide and the stopper comprises a thermoplastic polymer which is either welded onto the monofilament in a two-part form or is provided with spikes and bonded to the monofilament by fusion or by spraying on by means of injection-molding processes. The adhesion can be brought about mechanically by fusion and/or chemically (adhesion forces between various components).

The stoppers generally serve to limit the mobility of rotors or clips to which hooklines and hooks are attached.

The stoppers applied by existing processes exhibit too little adhesion, even if the same polymer material is used for stopper and line.

Commercially available systems tried to improve the adhesion by means of glassfiber-including stoppers.

Especially commercial fishing, since the use of driftnets is increasingly prohibited, requires systems providing a slippage resistance (pulloff resistance of the stopper) of almost 1000 N (in the moist state!). Such continuous lines are kilometers in length and require a very high tensile strength. Given a length of from 10 to 20 km owing to the weight of hooked fish or hangers on the bottom, high slippage resistances of the stoppers and a high line breaking strength are desirable.

Furthermore, commercially available systems exhibit an unsatisfactory knot strength of the monofil, since knotting a monofilament considerably reduces the tensile strength in the region of the knot.

SUMMARY OF THE INVENTION

It is an object of the present invention to provide longlines whose stoppers have a higher slippage resistance in the moist state and whose monofil lines exhibit improved knot strength.

We have found that this object is achieved by the longlines defined at the beginning. Preferred embodiments are revealed in the subclaims.

We have also found processes for producing these longlines and also their use for manufacturing continuous lines, angling lines and fishlines.

BRIEF DESCRIPTION OF THE DRAWING

The drawing is an illustrative diagram of a section of a continuous line for catching fish made in accordance with this invention.

Polyamide monofilament A) of the longlines of this invention customarily comprises one or more polyamides which may include up to 30% by weight, preferably up to 15% by weight (based on 100% by weight of polyamide), of further, additive substances and processing aids.

Figure 1:
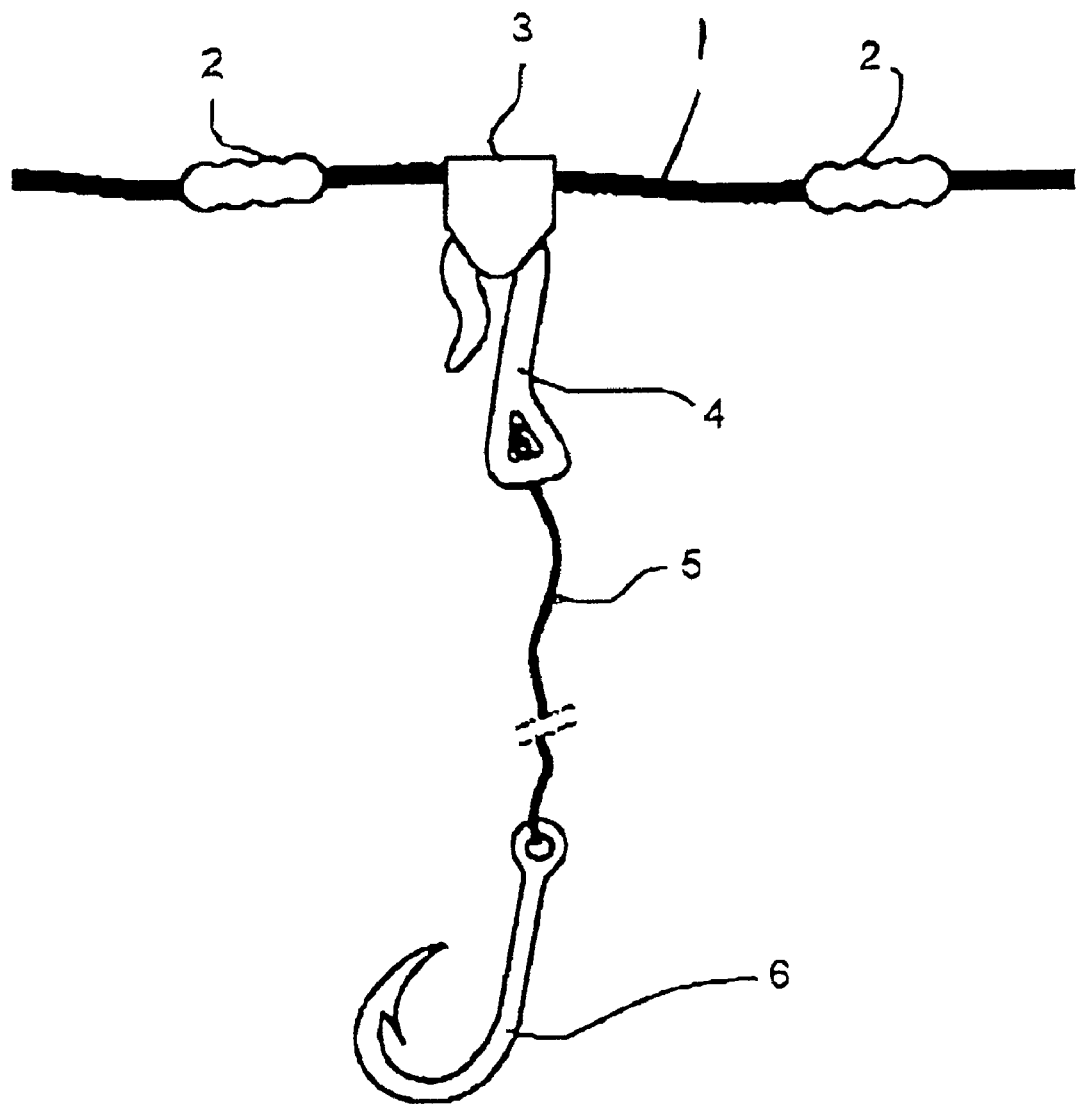

The monofils are generally from 1 to 5, in particular from 1.5 to 2.5, mm in diameter.

Suitable polyamides for the monofils have a viscosity number (VN) of at least 180 ml/g, preferably at least 200 ml/g, especially at least 220 ml/g; determined in a 0.5% strength by weight solution in 96% strength by weight sulfuric acid at 25° C. in accordance with ISO 307.

Semicrystalline or amorphous resins having a molecular weight (weight average) of at least 5000 as described for example in U.S. Pat. Nos. 2,071,250, 2,071,251, 2,130,523, 2,130,948, 2,241,322, 2,312,966, 2,512,606 and 3,393,210 are preferred.

Examples thereof are polyamides derived from lactams having from 7 to 13 ring members, such as polycaprolactam, polycapryllactam and polylaurolactam, and also polyamides obtained by reacting dicarboxylic acids with diamines.

Suitable dicarboxylic acids include alkanedicarboxylic acids having from 6 to 12, in particular from 6 to 10, carbon atoms and aromatic dicarboxylic acids. Exemplary acids are adipic acid, azelaic acid, sebacic acid, dodecanedioic acid and terephthalic and/or isophthalic acid.

Suitable diamines include in particular alkanediamines having from 6 to 12, in particular from 6 to 8, carbon atoms and also m-xylylenediamine, di(4-aminophenyl)methane, di(4-aminocyclohexyl)methane, 2,2-di(4-aminophenyl) propane or 2,2-di(4-aminocyclohexyl)propane.

Preferred polyamides are polyhexamethyleneadipamide, polyhexamethylen-esebacamide and polycaprolactam.

Also suitable are polyamides obtainable for example by condensation of 1,4-diaminobutane with adipic acid at elevated temperature (nylon-4,6). Processes producing polyamides of this structure are described for example in EP-A 38 094, EP-A 38 582 and EP-A 39 524.

Also suitable are polyamides obtainable by copolymerization of two or more of the aforementioned monomers or mixtures of a plurality of polyamides in any mixing ratio.

Particularly preferred polyamides are copolyamides 6/66, especially those having an 80:20, preferably 85:15, ratio of 6/66 units (eg. Ultramid® C from BASF AG).

The polyamides may include further, additive substances and processing aids.

Customary additives include for example stabilizers and oxidation inhibitors, agents against thermal decomposition and decomposition due to ultraviolet light, lubricants, demolding agents, dyes, pigments and plasticizers and also toughening polymers (rubbers).

Oxidation inhibitors and thermal stabilizers which can be included in the thermoplastic compositions of this invention include for example halides selected from the group of metals of group I of the Periodic Table, eg. lithium, sodium, potassium halides, and copper(I) halides, eg. chlorides, bromides or iodides, or mixtures thereof It is also possible to use sterically hindered phenols, secondary, aromatic amines, hydroquinones, substituted representatives of this group and mixtures thereof, preferably in concentrations of up to 1% by weight, based on the weight of the mixture.

Examples of UV stabilizers include substituted resorcinols, sterically hindered phenols, salicylates, benzotriazoles and benzophenones, which can generally be used in amounts of up to 2% by weight.

Lubricants and demolding agents, which can generally be added to the polyamide in an amount of up to 1% by weight, include for example long-chain fatty acids or derivatives thereof such as stearic acid, stearyl alcohol, alkyl stearates, stearamides and also esters of pentaerythritol with long-chain fatty acids.

It is further possible to add inorganic pigments such as titania, ultramarine blue, iron oxide and carbon black and organic pigments such as phthalocyanines, quinacridones, perylenes and also dyes such as nigrosine and anthraquinones as colorants.

Sodium phenylphosphinate, alumina, silica, nylon 22 and preferably talc can be used as nucleating agents, customarily in amounts of up to 1% by weight.

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

The longlines 1 can also comprise a plurality of polyamide monofils A) which are knotted together. This is a preferred embodiment especially for use as continuous lines in fishing.

The cylindrical hollow body (stopper 2) secured on the polyamide monofil consists essentially of a thermoplastic elastomer having a Shore D hardness (in accordance with DIN 53 505) of at least 50, preferably at least 60, in particular at least 70.

Preferred thermoplastic elastomers are thermoplastic polyurethanes (TPUs), preferably (polyether)polyurethanes. Very particular preference is given to TPUs based on polytetrahydrofuran (PTHF) having an average molecular weight ($M_n$) of from 200 to 3000, preferably from 1000 to 2000, as polyetherol components of the TPU.

Suitable TPUs can be prepared for example by reacting
a) organic, preferably aromatic, diisocyanates,
b) polyhydroxy compounds having molecular weights from 500 to 8000, and
c) chain extenders having molecular weights from 60 to 400 in the presence of optionally
d) catalysts,
e) auxiliaries and/or additives.

The usable starting materials (a) to (c), catalysts (d), auxiliaries and additives (e) will now be more particularly described:

a) Suitable organic diisocyanates (a) include for example aliphatic, cycloaliphatic and preferably aromatic diisocyanates. Specific examples include aliphatic diisocyanates such as hexamethylene diisocyanate, cycloaliphatic diisocyanates such as isophorone diisocyanate, 1,4-cyclohexane diisocyanate, 1-methyl-2,4- and -2,6-cyclohexane diisocyanate and also the corresponding isomer mixtures, 4,4'-, 2,4'- and 2,2'-dicyclohexylmethane diisocyanate and also the corresponding isomer mixtures and preferably aromatic diisocyanates such as 2,4-toluylene diisocyanate, mixtures of 2,4- and 2,6-toluylene diisocyanate, 4,4'-, 2,4'- and 2,2'-diphenylmethane diisocyanate. Mixtures of 2,4'- and 4,4'-diphenylmethane diisocyanate, urethane-modified liquid 4,4'- and/or 2,4'-diphenylmethane diisocyanates, 4,4'-diisocyanato-1,2-diphenylethane and 1,5-naphthylene diisocyanate. Preference is given to using hexamethylene diisocyanate, isophorone diisocyanate, 1,5-naphthylene diisocyanate, diphenylmethane diisocyanate isomer mixtures having a 4,4'-diphenylmethane diisocyanate content of greater than 96% by weight and in particular 4,4'-diphenylmethane diisocyanate.

b) Suitable high molecular weight polyhydroxy compounds (b) having molecular weights from 500 to 8000 are preferably polyetherols and polyesterols. However, it is also possible to use hydroxyl-containing polymers, for example polyacetals, such as polyoxymethylenes and especially water-insoluble formals, eg. polybutanediol formal and polyhexanediol formal, and polycarbonates, especially those formed from diphenyl carbonate and 1,6-hexanediol by transesterification, having the abovementioned molecular weights. The polyhydroxy compounds have to have an at least predominantly linear structure, ie. difunctional within the meaning of the isocyanate reaction. The polyhydroxy compounds mentioned can be used as individual components or in the form of mixtures.

Suitable polyetherols can be prepared by reacting one or more alkylene oxides having from 2 to 4 carbon atoms in the alkylene moiety with an initiator molecule containing two active hydrogen atoms. Suitable alkylene oxides include for example ethylene oxide, 1,2-propylene oxide, 1,2- and 2,3-butylene oxide. Preference is given to using ethylene oxide and mixtures of 1,2-propylene oxide and ethylene oxide. The alkylene oxides can be used individually, alternatingly in succession or as a mixture. Examples of suitable initiator molecules include water, amino alcohols, such as N-alkyldiethanolamines, for example N-methyldiethanolamine, and diols, such as ethylene glycol, 1,3-propylene glycol, 1,4-butanediol and 1,6-hexanediol. If desired, it is also possible to use mixtures of initiator molecules. Suitable polyetherols further include the hydroxyl-containing polymerization products of tetrahydrofuran (polyoxytetramethylene glycols).

Preference is given to using polyetherols formed from 1,2-propylene oxide and ethylene oxide in which more than 50%, preferably from 60 to 80%, of the OH groups are primary hydroxyl groups and in which at least some of the ethylene oxide forms a terminal block, in particular, for example, polyoxytetramethylene glycols.

Such polyetherols can be obtained by for example polymerizing the initiator molecule first with the 1,2-propylene oxide and then with the ethylene oxide or initially copolymerizing all the 1,2-propylene oxide in a mixture with some of the ethylene oxide and then polymerizing the rest of the ethylene oxide or stepwise by first polymerizing part of the ethylene oxide, then all the 1,2-propylene oxide and then the rest of the ethylene oxide with the initiator molecule.

The essentially linear polyetherols have molecular weights from 500 to 8000, preferably from 600 to 6000, in particular from 800 to 3500. They can be used not only individually but also in the form of mixtures with one another.

Suitable polyesterols are preparable for example from dicarboxylic acids having from 2 to 12 carbon atoms, preferably from 4 to 8 carbon atoms, and polyhydric alcohols. Suitable dicarboxylic acids include for example aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a succinic, glutaric and adipic acid mixture. Similarly, it is possible to use mixtures of aromatic and aliphatic dicarboxylic acids. For preparing the polyesterols it can be advantageous, if desired, to use not the dicarboxylic acids but the corresponding dicarboxylic acid derivatives, such as dicarboxylic esters having from 1 to 4 carbon atoms in the alcohol moiety, dicarboxylic anhydrides or dicarbonyl chlorides. Examples of polyhydric alcohols are glycols having from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the properties desired, the polyhydric alcohols can be used alone or if desired in mixtures with one another.

Also suitable are esters of carbonic acid with the diols mentioned, in particular those having from 4 to 6 carbon atoms, such as 1,4-butanediol and/or 1,6-hexanediol, condensation products of w-hydroxycarboxylic acids, for example w-hydroxycaproic acid, and preferably polymerization products of lactones, for example substituted or unsubstituted w-caprolactones.

Preferred polyesterols are dialkylene glycol polyadipates having from 2 to 6 carbon atoms in the alkylene moiety, eg. ethanediol polyadipates, 1,4-butanediol polyadipates, ethanediol butanediol 1,4-polyadipates, 1,6-hexanediol neopentyl-glycol polyadipates, polycaprolactones and especially 1,6-hexanediol 1,4-butanediol polyadipates.

The polyesterols have molecular weights from 500 to 6000, preferably from 800 to 3500.

c) Suitable chain extenders (c) having molecular weights from 60 to 400, preferably from 60 to 300, preferably include aliphatic diols having from 2 to 12 carbon atoms, preferably having 2, 4 or 6 carbon atoms, eg. ethanediol, 1,6-hexanediol, diethylene glycol, dipropylene glycol and especially 1,4-butanediol. However, it is also possible to use diesters of terephthalic acid with glycols having from 2 to 4 carbon atoms, for example bisethylene glycol or bis-1,4-butanediol terephthalate, hydroxyalkylene ethers of hydroquinone, eg. 1,4-di(β-hydroxyethyl)hydroquinone, (cyclo)aliphatic diamines, eg. 4,4'-diaminodicyclohexylmethane, 3,3'-dimethyl-4,4'-diaminodicyclohexylmethane, isophoronediamine, ethylenediamine, 1,2-, 1,3-propylenediamine, N-methylpropylene-1,3-diamine, N,N'-dimethylethylenediamine, and aromatic diamines, eg. 2,4- and 2,6-toluylenediamine, 3,5-diethyl-2,4- and -2,6-toluylenediamine and primary ortho-di-, -tri- and/or -tetra-alkyl-substituted 4,4'-diaminodiphenylmethanes.

To control TPU hardness and melting point, formative components (b) and (c) can be varied within relatively wide molar ratios. It is advantageous to use molar ratios of polyhydroxy compounds (b) to chain extenders (c) of from 1:1 to 1:12, especially from 1:1.8 to 1:6.4, in which case the hardness and the melting point of the TPUs increase with increasing diol content.

To prepare the TPUs, formative components (a), (b) and (c) are reacted in the presence of optionally catalysts (d), auxiliaries and/or additives (e) in such amounts that the equivalence ratio of NCO groups of diisocyanates (a) to the sum of the hydroxyl groups or hydroxyl and amino groups of components (b) and (c) is within the range from 1:0.85 to 1:1.20, preferably from 1:0.95 to 1:1.05, especially from 1:0.98 to 1:1.02.

d) Suitable catalysts which speed up in particular the reaction between the NCO groups of diisocyanates (a) and the hydroxyl groups of formative components (b) and (c) include the well known and customary tertiary amines, eg. triethylamine, dimethylcyclohexylamine, N-methylmorpholine, N,N'-dimethylpiperazine, 2-(dimethylaminoethoxy)ethanol, diazabicyclo(2,2,2) octane and the like and in particular organic metal compounds such as titanic esters, iron compounds such as iron(III) acetylacetonate, tin compounds, eg. tin diacetate, tin dioctoate, tin dilaurate or the tin dialkyl salts of aliphatic carboxylic acids such as dibutyltin diacetate, dibutyltin dilaurate or the like. The catalysts are customarily used in amounts from 0.001 to 0.1 part per 100 parts of polyhydroxy compound (b).

As well as catalysts, formative components (a) to (c) may also incorporate auxiliaries and/or additives (e), in amounts of up to 40, preferably up to 20, % by weight, based on 100% of thermoplastic elastomer. Examples are lubricants, inhibitors, stabilizers against hydrolysis, light, heat or discoloration, dyes, pigments, inorganic and/or organic fillers and plasticizers.

Details about the abovementioned auxiliary and additive substances are given in the technical literature, for example the monograph by J. H. Saunders and K. C. Frisch, "High Polymers", Volume XVI, Polyurethanes, Parts 1 and 2, Verlag Interscience Publishers 1962 and 1964, respectively, or DE-B2901774.

The stoppers 2 of the longlines of this invention are particularly advantageously made with those TPUs which include up to 25, preferably up to 15, % by weight of fibrous filler, preferably glass fibers.

Suitable products are commercially available as Elastollan® 1174D, Elastollan®R3000 and Elastollan®R3001, from ElastogranGmbH, DE.

For better flexural strength, stopper 2 can be provided with at least one radial constriction. It preferably has at least 3 and in particular 5 radial constrictions. Generally the external diameter is from 3 to 10 mm, preferably from 6 to 8 mm. The length of the stopper on the monofilament is customarily from 10 to 80 mm, preferably from 20 to 30 mm.

The spacing of the stoppers on the monofil is generally not critical and depends essentially on the intended use. For example, two stoppers can firmly grasp one clip 3 with associated hookline 5, in which case care has to be taken to ensure that the distance to the two nearest stoppers plus clips and hookline is sufficient for the hooklines not to become mutually entangled. In a further embodiment of the longlines, the clips plus hooklines can be limited in their mobility along the line by individual stoppers.

A conventional hookline is attached to clip 3 by a hook 4 and is attached at its other end to a fishhook 6.

The clip, which is freely rotatable about the longline, can also be moved along the longitudinal direction (eg. by the fish) as a result. In a further embodiment it is also possible to apply clips (plus hooklines) on the stoppers themselves. Such clips are freely rotatable about the line, but are not free to move in the longitudinal direction of the line.

We have also found a process for manufacturing a longline, which comprises a) extruding a polyamide melt through a die to form a polyamide monofil, b) cooling the monofil, c) drawing the monofil in the longitudinal direction in at least one further step, d) relaxing the monofil, and then e) securing said stoppers b) on the monofil.

In general, the aforementioned polyamides are introduced as pellets with or without further, additive substances into suitable apparatus, for example extruders, and processed to form a homogeneous melt which is extruded through a die so as to form a monofil.

The extruded monofils can be cooled in one or more stages by passing monofils through one or more successive waterbaths.

The cooling water in these baths is customarily regulated and/or circulated so that temperatures from 10 to 20° C., preferably from 15 to 25° C., are achieved.

The monofils are then drawn in the longitudinal direction in at least one further process step. Preferably, to improve the adhesion of the stopper, the monofil cross-section is flattened by suitable means (eg. an embossing station) before drawing, preferably at the position of the stopper on the longline and over the length which the stopper is subsequently intended to occupy on the line.

Process step c) in a preferred embodiment is carried out in at least 2 stages, at least one drawing being carried out in steam at temperatures from 95 to 105° C., preferably from 100 to 102° C., and at least one further drawing being carried out in hot air at temperatures from 240 to 330° C., preferably from 270 to 310° C.

For this the monofils are for example passed over rolls which rotate at different speeds so that the monofils are drawn to a draw ratio of not more than 7, preferably not more than 6.3, in total.

In the preferred two-stage embodiment, the drawing in steam is to a draw ratio of from 3.2 to 4.2 and the drawing in hot air is to a draw ratio of from 1.24 to 1.82, making a total draw ratio for the two stages of from 5.2 to 5.8.

This preferred drawing leads in particular to an increase in the knot strength of the monofils. Subsequently, the monofils are relaxed over rolls which rotate slower than the draw rolls by a factor of from 0.90 to 0.98, preferably from 0.93 to 0.96.

Relaxation generally serves to stabilize and set the drawn monofil properties and is generally carried out at temperatures from 140 to 220° C., preferably from 160 to 190° C.

The monofils then have stoppers B) applied to them by means of suitable processes, for example welding or injection-molding processes (see for example NO-A 87/0531).

To improve the adhesion of the stopper on the monofil surface, the latter can preferably be pretreated, in which case a pretreatment can be carried out in particular by means of the corona process.

The corona surface effect is due to the bombarding of the polymer surface with electrons. These leave the electrode and are accelerated by the effect of the high voltage in the direction of the moving web. On the way they collide with air molecules, which in turn emit light and in some instances react to form ozone and nitrogen oxides. When the electrons impact the polymer, they have so much energy that they can break the bonding, for example between carbon and hydrogen or between two carbon atoms. The free valences (radicals) are then the site of reactions with the corona gas, predominantly oxidations.

The functional groups formed are polar and hence the basis for the adhesion of, for example, applied printing inks, coatings, etc.

The best effectivity is achieved when the discharge is very uniform and the discharge current is very high while sparks are gentle. The discharge current depends on generator power and on the electrical coordination of generator, high voltage transformer, electrode and counter-electrode. The gentle and homogeneous sparks profile is determined by the design and construction of the electrode and the working frequency of the generator.

In a particularly preferred embodiment, the pretreatment can be effected for example by passing the monofil through a high voltage field, in which case the monofil surface is statically charged up in parts via multipoint electrodes.

The longlines of this invention are useful for manufacturing angling lines, fishlines and especially continuous lines for catching fish. Apparatus and processes for securing the clips plus hooklines are discernible for example from EP-A 537 193, U.S. Pat. No. 4,407,087 and also technical publications of Mustad & Søn, Norway.

EXAMPLES

I. Monofil Production

Polyamide granules comprising a copolyamide with 85% by weight of PA6 and 15% by weight of PA66 units (Ultramid® C4 from BASF AG) with a viscosity number (VN) of 250 ml/g (measured on a 0.5% strength by weight solution in 96% strength by weight $H_2SO_4$ at 25° C. in accordance with ISO307) were melted in an extruder at 280° C., the melt was extruded at 285° C., and the extrudate was cooled by a waterbath at 19° C. The drawing was carried out in a 1st stage in steam (100° C.) to a draw ratio of 4.1 and then in hot air at 305° C. to a total draw ratio of 5.4. Subsequent relaxation at 185° C. shrank the monofil back, so that the post-relaxation draw ratio was 5.1.

TABLE 1

| Properties of monofil | | |
|---|---|---|
| Diameter | | |
| Average | mm | 2.465 |
| Minimum | mm | 2.327 |
| Maximum | mm | 2.613 |
| Test condition | | Käfer MFT 30; n = 20 |
| Fineness | tex | |
| Test condition | | weighed length: 0.6 m |
| | | Dry tests |
| Strength | | |
| UTS | N | 2379.14 |
| CV (coefficient of variation) | % | 5.10 |
| UTS elongation | % | 31.8 |
| CV | % | 11.30 |
| UTS/fineness | cN/tex | |
| Test condition | | Zwick 1435; n = 10 (number of measurements) |
| Knot strength | | |
| Average | N | 1710.63 |
| Minimum | N | 1347.84 |
| Maximum | N | 1889.28 |
| CV | % | 8.62 |
| Test condition | | Zwick 1435; L = 50 mm; n = 30 |
| Stiffness | cN | 72.0 |
| Bending stress | N/mm² | 24.0 |
| Test condition | | L. + W.; 30° bending radius; L = 50 mm; n = 10 |

II. Stopper

The following compositions were used:
1. For Comparison
   polyamide 66 with VN 150 ml/g including 20% by weight of an ethylene/acrylic acid/n-butyl acrylate/maleic anhydride copolymer (60/4.3/35/0.7) as toughener (Ultramid® A3Z from BASF AG)
2. For Comparison
   polyamide 66 with VN 150 ml/g including 1% by weight of carbon black, 8% by weight of the same toughener as under 1. and 40% by weight of glass fibers (Ultramid®A3ZG8 from BASF AG)
3. For Comparison
   polyamide 6 with VN 140 ml/g including 30% by weight of glass fibers (Ultramid®BEG6 from BASF AG)

4. A Thermoplastic Polyurethane (TPU) Formed from
polytetrahydrofuran ($M_n$: 1000) (polyetherol),
4,4'-diphenylmethane diisocyanate (MDI),
1,4-butanediol
(Elastollan® 1174 D from Elastogran GmbH)
Shore D hardness (as defined in DIN 53505): 50
5. TPU Formed from
hexanediol butanediol adipate,
MDI,
1,4-butanediol
with 0.3% by weight of Stabaxol® (stabilizer based on an aromatic carbodiimide)
and
20% by weight of glass fibers (Elastollan® R3000 from Elastogran GmbH)
Shore D hardness: 73
6. TPU Comprising
65% by weight of TPU formed from
a) butanediol adipate,
polytetrahydrofuran ($M_n$: 1000),
polytetrahydrofuran ($M_n$: 2000),
MDI,
butanediol
mixed with
19% by weight of TPU formed from
b) polytetrahydrofuran ($M_n$: 1000),
MDI,
butanediol
stabilized with 0.2% by weight of Irganox® 1010 (Ciba Geigy AG)
1% by weight of carbon black
15% by weight of glass fibers
(Elastollan® R 3001 from ElastogranGmbH)
Shore D hardness: 75

III. Production of Longlines

Stoppers 1 to 6 were applied to the monofil by injection molding. The melt temperatures are shown in the table.
The number of radial constrictions was: 5
Length of stopper: 30 mm
Diameter (outer) of stopper: 7 mm

IV. Pretreatment of Monofils

Type 1: Corona Pretreatment by Softal, Hamburg
corona pretreatment via two ceramic electrodes having dimensions
12×16×100 mm
applied voltage: 10 kV
monofil-electrode distance 0.6 mm
pulloff speed: 1 m/min
Type 2: Pretreatment on Carrier Roll (Corona Apparatus for Films from Softal, Hamburg)
knife electrode with 11 steel knives
roll diameter: 255 mm
applied voltage: 1 kV
Knife electrode-monofil distance: 2 mm
roll circumferential speed: 40 m/min
number of roll revolutions: 2×3 (monofils treated from both sides)
Type 3: Pretreatment via KNH 34 High Voltage Generator from Eltex, Weil am Rhein Principle: Partial Chargeup of Monofil Surface via Three Point Electrode
applied voltage via generator: 20 kV
electrode-monofil distance: 50–70 mm
treatment time 2×3 s (monofil treated from both sides)
The pulloff resistance of the stopper [N] was measured in accordance with the data given below in the table
a) following air aging at room temperature
b) following water aging (24 h) at room temperature and
c) with or without pretreatment of the monofil.

The pulloff resistance was measured on a Zwick 1435 tensile tester by fixing the longline in a clamp. The stopper was guided above the roll through a metal bolt having a round throughhole so that the stopper came to rest on the bolt. The bolt is then guided upward while the force required to detach the stopper from the monofil is measured.

The results of the measurements are shown in table 2.

TABLE 2

| Example | Stopper type | Melt temperature [° C.] | Aging Air | Aging Water | Pre-treatments | Average pulloff force [N] |
|---|---|---|---|---|---|---|
| 1C | 1 | 280 | + | − | — | 224 |
| 2C | 2 | 280 | + | − | — | 520 |
| 3C | 2 | 295 | + | − | — | 559 |
| 4C | 2 | 300 | + | − | — | 590 |
| 5C | 3 | 280 | + | − | — | 449 |
| 6 | 4 | 230 | + | − | — | 764 |
| 7 | 4 | 230 | − | + | — | 834 |
| 8 | 4 | 230 | − | + | Type 2 | 925 |
| 9 | 4 | 230 | + | − | Type 3 | 874 |
| 10 | 4 | 230 | − | + | Type 3 | 1040 |
| 11 | 5 | 250 | + | − | — | 1011 |
| 12 | 5 | 250 | − | + | — | 1004 |
| 13 | 5 | 250 | − | + | Type 1 | 968 |
| 14 | 5 | 250 | − | + | Type 2 | 995 |
| 15 | 5 | 250 | + | − | Type 3 | 1073 |
| 16 | 5 | 250 | − | + | Type 3 | 943 |
| 17 | 6 | 250 | + | − | — | 1222 |
| 18 | 6 | 250 | − | + | — | 1250 |
| 19 | 6 | 250 | − | + | Type 2 | 1180 |
| 20 | 6 | 250 | + | − | Type 3 | 1327 |
| 21 | 6 | 250 | − | + | Type 3 | 1220 |

We claim:

1. A longline comprising at least one polyamide monofil with at least one stopper secured on the polyamide monofil surface, wherein said stopper consists essentially of a thermoplastic elastomer having a Shore D hardness of at least 50.

2. A longline as defined in claim 1, wherein the outer surface of said stopper is provided with at least one radial constriction.

3. A longline as defined in claim 1, wherein said thermoplastic elastomer has a Shore D hardness of at least 70.

4. A longline as defined in claim 1, wherein said thermoplastic elastomer includes up to 40% by weight of further additive substances and processing aids.

5. A longline as defined in claim 1, wherein said thermoplastic elastomer consists essentially of a thermoplastic polyurethane.

6. A longline as defined in claim 1, wherein the polyamide of said monofil has a viscosity number of at least 180 ml/g.

7. A longline as defined in claim 1, wherein the polyamide of said monofil comprises PA6 or 6/66 copolyamide or mixtures thereof.

8. Angling lines, fishlines and continuous lines for catching fish, formed from the longlines of claim 1.

9. A process for manufacturing a longline, which longline comprises at least one polyamide monofil with at least one stopper secured on the polyamide monofil surface, wherein said stopper consists essentially of a thermoplastic elastomer having a Shore D hardness of at least 50, which process comprises
  a) extruding a polyamide melt through a die to form a polyamide monofil,
  b) cooling the monofil,
  c) drawing the monofil in the longitudinal direction in at least one further step,
  d) relaxing the monofil, and then
  e) securing said at least one stopper on the monofil.

10. A process as defined in claim 9, wherein the monofil cross-section is flattened before the drawing (step c).

11. A process as defined in claim 9, wherein step c) is carried out in at least 2 stages, at least one drawing being carried out in steam and at least one further drawing in hot air.

12. A process as defined in claim 9, wherein the monofil is drawn to a draw ratio of not more than 7 in total.

13. A process as defined in claim 9, wherein the monofil surface is pretreated before the securing of said stoppers B).

14. A process as defined in claim 9, wherein the monofil surface is pretreated by means of the corona process or by means of high voltage.

* * * * *

UNITED STATES PATENT AND TRADEMARK OFFICE
CERTIFICATE OF CORRECTION

PATENT NO. : 6,655,076 B1
DATED : December 2, 2003
INVENTOR(S) : Worf et al.

It is certified that error appears in the above-identified patent and that said Letters Patent is hereby corrected as shown below:

Title page,
Item [*] Notice, delete "363" and insert -- 422 --.

Signed and Sealed this

Thirtieth Day of August, 2005

JON W. DUDAS
*Director of the United States Patent and Trademark Office*